(12) United States Patent
Kelmenson et al.

(10) Patent No.: US 6,185,505 B1
(45) Date of Patent: Feb. 6, 2001

(54) BROAD OCEAN BATHYMETRIC FIX

(75) Inventors: Steven Kelmenson, Hicksville; Eugene C. Zavacki, Levittown, both of NY (US)

(73) Assignee: Lockheed Martin Corporation, Bethesda, MD (US)

(*) Notice: Under 35 U.S.C. 154(b), the term of this patent shall be extended for 0 days.

(21) Appl. No.: 09/148,598

(22) Filed: Sep. 4, 1998

(51) Int. Cl.$^7$ .................................................. G01S 15/00
(52) U.S. Cl. .......................... 701/220; 701/221; 367/12; 367/87; 367/88; 367/118; 367/124; 367/131; 367/900
(58) Field of Search ...................... 701/220, 221, 701/205; 367/12, 87, 88, 900, 902, 903, 119, 124, 131, 118; 73/597, 602

(56) References Cited

U.S. PATENT DOCUMENTS

| | | | |
|---|---|---|---|
| 5,122,990 | * | 6/1992 | Deines et al. ........................ 367/100 |
| 5,422,860 | * | 6/1995 | Bradley et al. ........................ 367/89 |
| 5,640,369 | * | 6/1997 | Capell, Sr. ............................. 367/88 |

* cited by examiner

Primary Examiner—William A. Cuchlinski, Jr.
Assistant Examiner—Yonel Beaulieu
(74) Attorney, Agent, or Firm—Seymour Levine

(57) ABSTRACT

A method of correcting errors in in inertial navigation system, without imposing restrictions on the ships course, utilizing bathymetric data collected during the Ocean Survey Program (OSP). As the ship is in transit in or crosses an OSP swath, sonar transmissions commence and continue only to acquire bottom data within data areas of predetermined dimensions. Depth gates and transmission power levels are established in accordance with OSP provided bottom data and depth is determined by an autocorrelation process. A virtual linear map is established with the OSP data in the predicted locations of data collection areas. The collected data is then compared to corresponding OSP data to determine inertial navigation system corrections.

16 Claims, 5 Drawing Sheets

BROAD OCEAN BATHYMETRIC FIX

BACKGROUND OF THE INVENTION

1. Field of the Invention

The invention pertains to the field of ship inertial navigation, and more particularly to the application of external measurements to correct errors in the predicted position provided by an inertial navigation system.

2. Description of the Prior Art

Periodic external position information is required to correct errors in the predicted position given by a ship's inertial navigation system. These errors are caused by inaccuracies that are inherent in the inertial navigation systems comprising the overall navigation system. One source of position information is the Classical Bathymetric Fix (Classical Fix) which requires the ship to transit a pre-surveyed area, known as a Precise Bathymetric Navigation Zone (PBNZ), maintain constant speed and heading while traversing the area, and produce pulsed acoustic signals at a rapid repetition rate. Each PBNZ must meet bottom slope and along and cross track variation requirements. Because of these requirements, PBNZs are only available sparsely throughout the oceans of the world. To implement the Classical Fix the nearest PBNZ to the ship must first be identified and the ship navigated to it. When the ship arrives at the PBNZ the rapid repetition rate acoustic radiation (sonar transmissions) commences. The sonar must first obtain and retain bottom lock-on and second collect sufficient depth data for position fix computation. Sonar transmissions continue for both bottom tracking and depth data collection as the ship traverses the length of the PBNZ. As the ship traverses the PBNZ it is required to maintain constant speed and heading. After the ship has traversed the entire PBNZ, the sonar depth data collected is used with previously collected and processed "truth" map data, representative of the depths in the PBNZ, in a map-matching algorithm. The differences between the two sets of data are resolved into latitude and longitude corrections which are applied to the navigation system.

SUMMARY OF THE INVENTION

The present invention utilizes bathymetric data collected during the Ocean Survey Program (OSP) in place of PBNZ data. During this program wide tracks (swaths) of bathymetric data were collected throughout the worlds oceans. Since OSP swaths are a great deal more prevalent than PBNZs, a ship need not transit to a PBNZ to begin the inertial navigation system fix process. This process begins by collecting data when a ship crosses or transits along an OSP swath while the ship maintains its course. As the ship is in transit within or crosses over an OSP swath, sonar transmissions begin and continue only until a bottom depth has been acquired. These depth data points are contained within areas of predefined dimensions. The data areas are used subsequently for the navigation fix and must satisfy at least three requirements. First, they must be a predetermined distance apart in order to guarantee independence. Second, they must be sufficiently within the OSP swath to provide buffers, on either side of the collected depth data, that are at least equal to the largest possible error of the inertial navigation system. Third, the buffer areas must exhibit contour variations in either or both along-track and cross-track directions.

After sonar data has been collected in a predetermined number of data areas a virtual linear map is formed using the OSP data corresponding to the inertial navigation system's indicated locations of the collection areas. The linearization of the OSP data areas creates a map similar to that used by the Classical Bathymetric Fix. Thus, the map matching algorithms of the classical fix may be utilized for the comparison of the collected sonar data to the OSP map data. The results of these comparisons may be employed to provide latitude and longitude corrections to the inertial navigation system.

The invention will now be described in greater detail with reference to the accompanying drawings.

DESCRIPTION OF THE PREFERRED EMBODIMENTS

Figure 1:
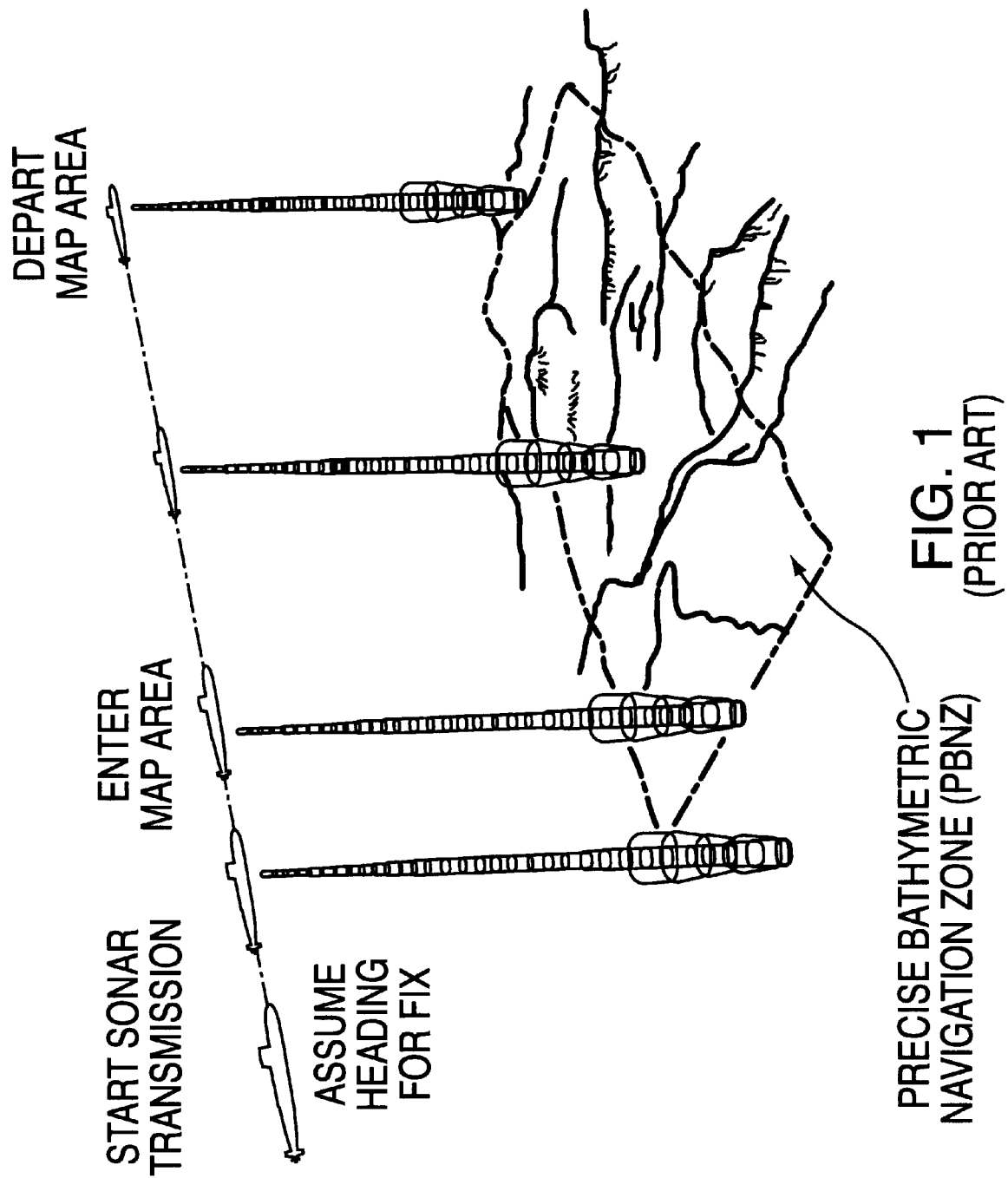
FIG. 1 is a time line presentation a bathymetric position fix in accordance with the prior art.

Refer now to the time presentation of a bathymetric fix utilized in the prior art, as shown in FIG. 1. After the ship has transited to a selected Precise Bathymetric Navigation Zone (PBNZ), it is directed to a heading for the fix along a linear track in the PBNZ. Rapid repetition rate sonar pulsed transmissions from the ship commence immediately upon entering the map area of the PBNZ. This rapid repetition rate, which is so rapid as to be almost continuous, obtains and retains bottom lock-on for the collection of depth data suitable for fix computations. Rapid repetition rate transmissions continue as the ship traverses the entire map area. To obtain good data the ship is required to maintain constant speed and heading as it transits through the PBNZ. After the map area is departed, the sonar depth data collected is compared With depth data of the PBNZ map, the location of which is accurately known, in a map matching algorithm.

Figure 2:
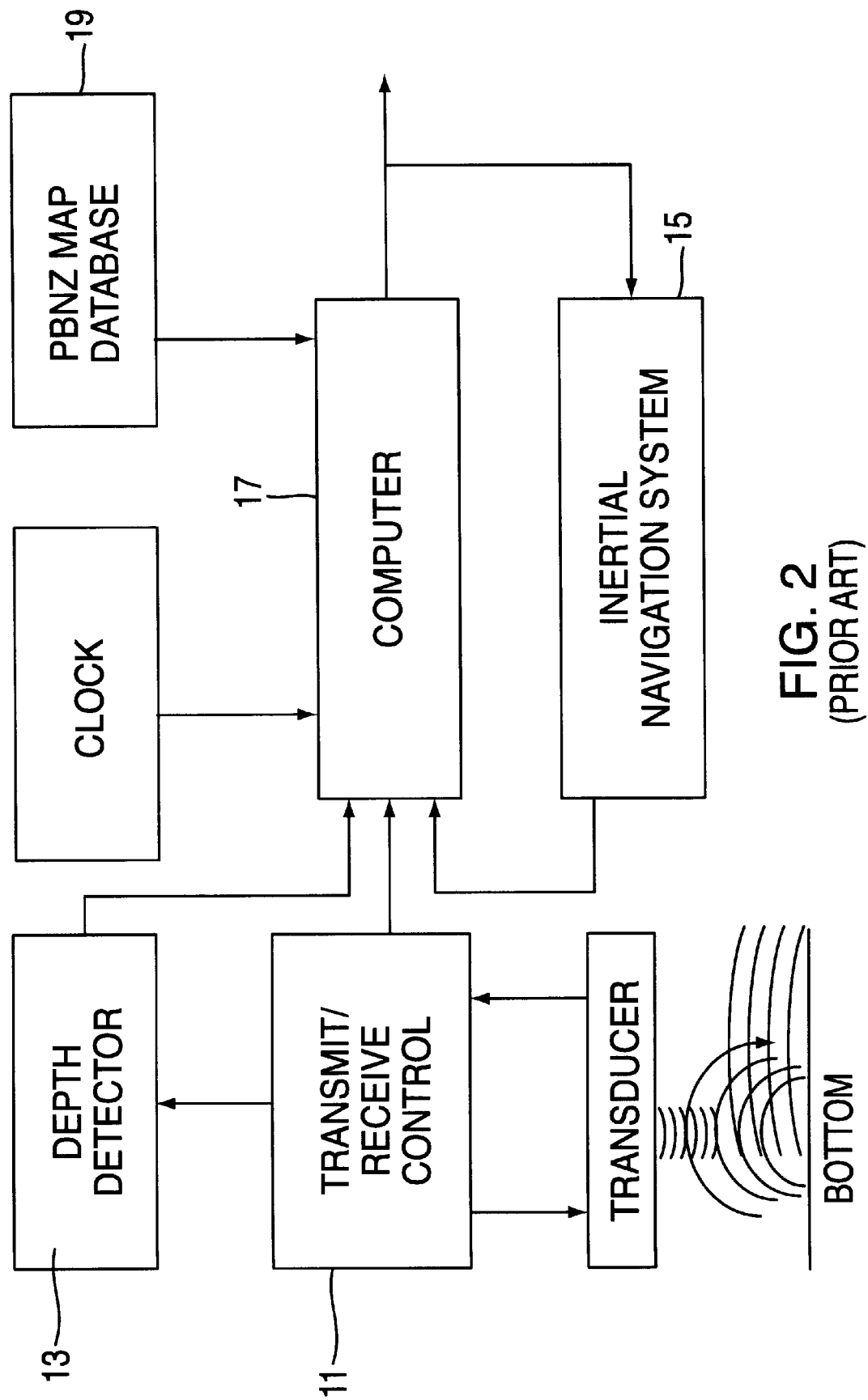
FIG. 2 is a block diagram of a system for implementing a bathymetric fix.

A block diagram of the map matching algorithm is shown in FIG. 2, to which we now refer. Transmit-receive intervals for each transmitted pulse are coupled from a transmit/receive control unit 11 to a depth detector 13, wherein the depth at a location indicated by the inertial navigation system 15, at the transmission time of a sonar pulse, is determined. Depth detector 13 determines keel depth and the transmit/receive control unit 11 determines depth below keel. These measurements taken together provide measured depth below surface. This measured depth below surface and the time the depth below surface was computed are sent to a computer 17, to which the indicated position of the ship is also coupled from the inertial navigation system 15. The depth below surface is compared by the computer 17 to depth data of the PBNZ which is coupled to the computer from a PBNZ map data base 19. The measured and stored depth data are matched in the computer 17 and differences between the inertial navigation system indicated latitude and longitude and the stored latitude and longitude at matched depth locations are utilized to provide corrections to the inertial navigation system 15.

Figure 3:
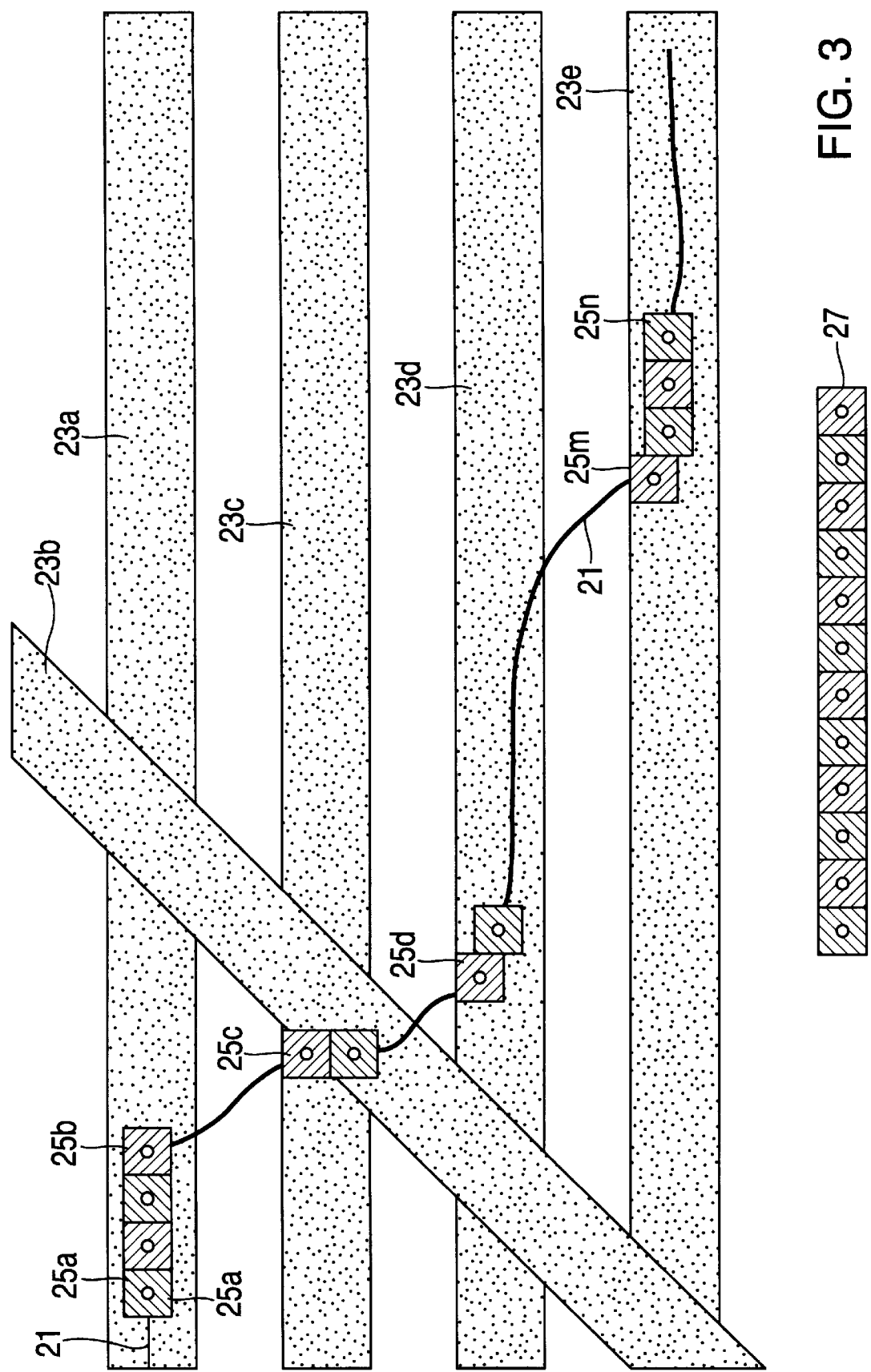
FIG. 3 is a representation of the formation of a linear track virtual map established with a non-linear ship course.

Wide tracks (swaths) of bathymetric data were collected as part of the Ocean Survey Program (OSP). Small swaths of the OSP bathymetric data which meet PBNZ slope and contour variation requirements are used to generate the PBNZs. The totality of the OSP data, however, is also available in digitized form. Consequently, a ship need not transit to a PBNZ to begin the navigation fix process. Refer now to FIG. 3. A ship, on a course 21, may begin the process, while maintaining its normal course, when it crosses an OSP swath 23a–23e. When the ship is within a swath, such as swath 23a, sonar transmissions may commence and continue for a time sufficient to acquire bottom data in the swath. Since the navigation system indicated location may be in error, the ship must be positioned with respect to the center of the swath such that a selected width, as for example the 3σ width corresponding to the inertial navigation system error, is wholly within the swath. The sonar transmissions are suspended after the ship leaves the swath and may recommence when another OSP swath, such as swath 23b, is encountered. This process of collecting data in OSP swaths continues until enough data collection areas 25a–25n have been traversed to establish a linear map 27, the formation of which is to be explained.

As the ship crosses an OSP track 23a–23e, depth data meeting predetermined criteria, is collected. Points at which the depth data is taken must have sufficient spacing to be independent. Data taken over areas less than the predetermined distance apart are not independent. Depth data must be taken over spatially separated contours to be independent. Further, as stated above, the ship must be sufficiently within the swath to provide a buffer equal to or greater than the selected possible inertial navigation system error. Still further, the data, indicated on the OSP map, within the buffer area must have either or both along-track and cross-track variability. When these conditions are met, the data is stored and the digital OSP data for the area, from which the data was taken, is placed in a memory as an area element (maplet) 25a–25n in the formation of virtual linear map. With the establishment of a linear map the map matching algorithms employed in the Classical Fix may utilized to compute the inertial navigation system correction. Thus, a latitude and longitude correction is applied to the inertial navigation system as though it was produced by the Classical Fix.

Figure 4:
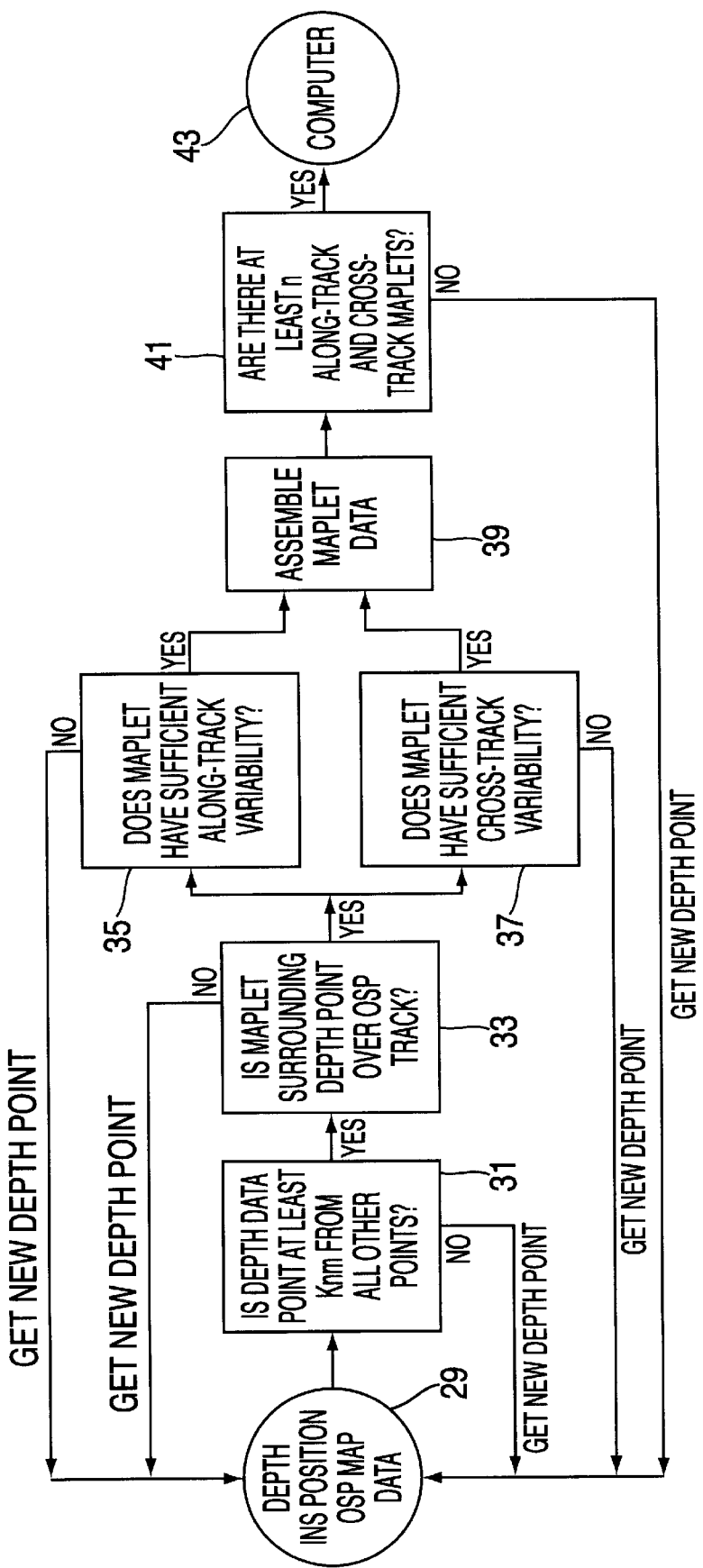
FIG. 4 is a flow chart of an algorithm that may be utilized to create a linear track virtual map with a non-linear ship track.

Refer now to FIG. 4, wherein a flow chart of the point selection algorithm for depth data points is shown. After depth data at an initial position has been acquired, a subsequent INS indicated position in the swath is selected and depth data is taken at that point. Depth data within a maplet, INS indicated position of the maplet, and OSP map data at the expected maplet position are provided from data collector 29 to a decision block 31, which determines if the maplet is a preselected number of nautical miles from the previous maplet. If the determination is "no", another maplet location is selected and its depth data, INS position, and OSP map data are provided to decision block 31 for evaluation. When the determination is "yes", the INS indicated position and the OSP map data are compared in decision block 33 to determine whether the maplet position is within an OSP swath. Should the determination be no, a request for a new maplet is sent the data collector 29 and the process is repeated. A "yes" determination enables decision blocks 35 and 37, which respectively determine whether along-track and cross-track data within the maplet exhibit sufficient contour variability. A "no" determination by either decision block rejects the maplet and requests data from the data collector 29 for another data set. When either decision block 35 or decision block 37 provide a positive response, a data assembler 39 couples the maplet data to a memory 41 for storage. If there are less than n along-track and n cross-track of maplets stored in memory 41, n being a predetermined number, a signal is sent to the data collector 29 to begin processing another maplet. After n cross-track and n along-track maplets have been accepted, memory 41 couples the stored data to a computer 43 wherein the maplet data is compared with a corresponding assembled virtual linear map.

Figure 5:
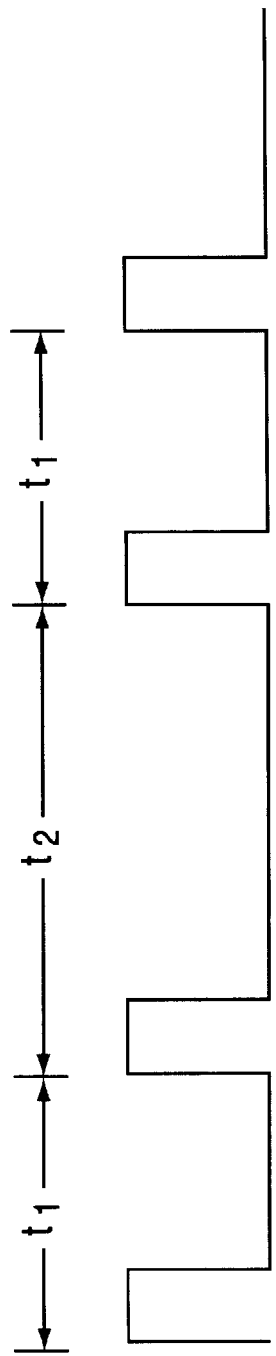
FIG. 5 is a sequence of pulses which may be utilized for gathering depth data.

Sonar transmissions for gathering depth data comprise a sequence of non-uniformly spaced equal time duration pulses. A sequence of four pulses which may be utilized is shown in FIG. 5. As shown in the figure, time interval $t_1$ between the first and second pulses is equal to time interval between the third and fourth pulses are equal, while the time interval $t_2$ between the second and third pulses differs from $t_1$. Though four pulses are shown in FIG. 5, it should be noted that this is limiting and that any number of pulses, with varying interpulse intervals, may be employed in a sequence. Each pulse is received within a depth gate which is set in accordance with the depth given in the OSP swath at the INS indicated position. Sonar transmission power for the pulse sequence may be varied with OSP map indicated depth, ambient sea noise, and the signal-to-noise ratio (SNR) required for detection of returned bottom bounces. Pulse sequences are manually initiated and depth is determined faith the utilization of correlation algorithms.

Figure 6:
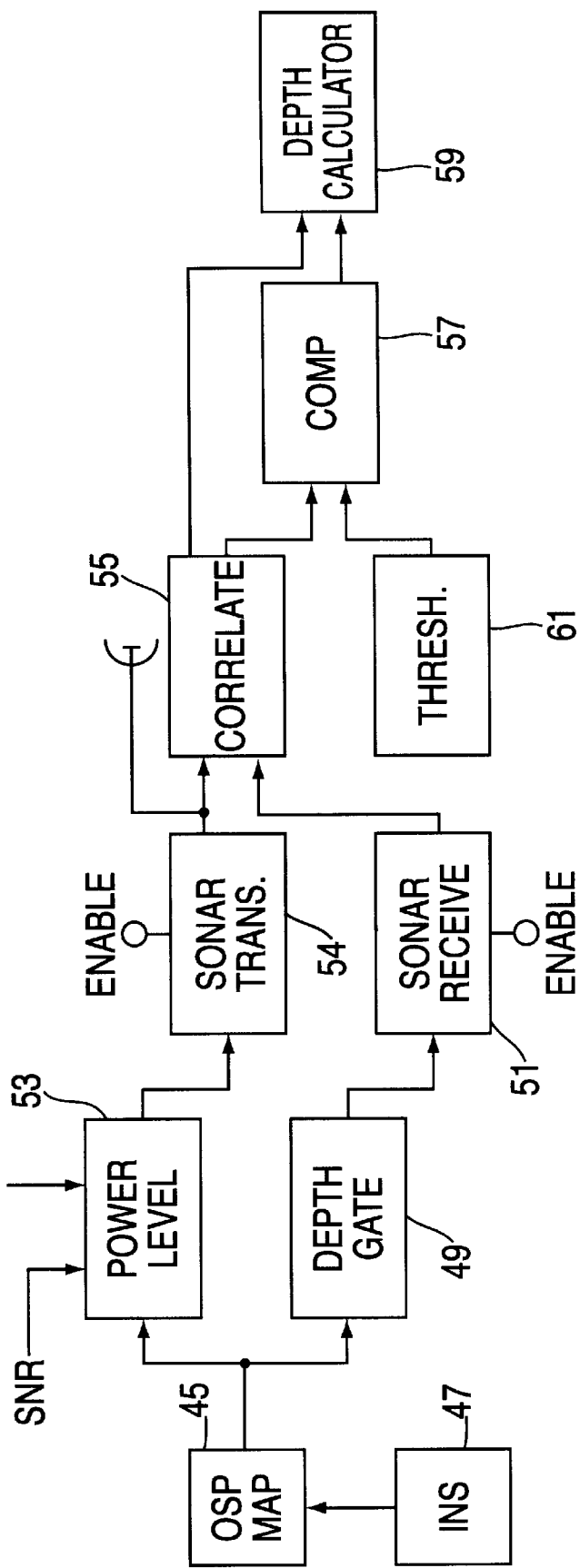
FIG. 6 is a block diagram of a system which may be utilized for obtaining depth data within OSP swaths.

Refer now to FIG. 6. OSP data in an OSP map data memory 45 is addressed at the ship's position indicated by an INS 47 and the depth at the indicated position is coupled a depth gate determinator 49 which sets a depth gate for a sonar receiver 51. Ocean depth, at the indicated position, is also coupled from OSP map data memory 45 to a power level set 53 to which signals representative of ambient sea noise and the SNR required for a predetermined probability of bottom bounce detection, from systems not shown, are also coupled. Power level set 53 establishes the sonar power level required to meet the SNR at the receiver for a predetermined probability of bottom bounce detection for the established depth and ambient ocean noise, and sets the power level of a sonar transmitter 54 accordingly. The sequence of sonar transmissions may be initiated by enabling the sonar transmitter 54 and sonar receiver 51 either manually or automatically.

A portion of the transmitted signal is coupled to a correlator 55 wherein it is coupled to a multiplicity of delay lines, each representative of a given depth within the depth gate. The output signal from each of the delay lines is then correlated with the received bottom bounce in a well known manner. The maximum of the resulting correlation signals is then coupled to a comparator 57 and to a depth calculator 59. Comparator 57 compares the maximum correlation signal to a threshold signal in the comparator 57 to a threshold signal coupled from a threshold signal generator 61. When the maximum correlation signal exceeds the threshold signal, the depth calculator determines the bottom depth corresponding to the delay associated with the maximum correlation signal.

While the invention has been described in its preferred embodiments, it is to be understood that the words which have been used are words of description rather than limitation and that changes may be made within the purview of the appended claims without departing from the true scope and spirit of the invention.

We claim:

1. A method for determining errors in an inertial navigation system's indicated ship's position utilizing a multiplicity of swaths of Ocean Survey Program (OSP) bathymetric data comprising the steps of:

obtaining bottom data in data areas of predetermined dimensions as said ship transits said OSP swaths;

noting locations indicated by said inertial navigation system at said data areas;

creating a virtual linear map of OSP data by arranging said OSP swaths at said noted locations in a contiguous linear manner;

comparing said bottom data obtained in said data areas to corresponding OSP bottom data in said linear map;

determining differences between said bottom data in said data areas and said corresponding OSP bottom data; and utilizing said differences to establish location corrections for said inertial navigation system.

2. The method of claim 1 wherein said obtaining step includes the steps of;

positioning said ship in each swath of said multiplicity of swaths of OSP bathymetric data such that a buffer exists between edges of each swath and either side of said ship; and collecting data in data areas with predetermined distance therebetween such that data in said data areas are independent.

3. The method of claim 2 wherein said obtaining step further includes the steps of transmitting and receiving sonar signals to collect bottom data.

4. The method of claim 3 wherein said sonar signals comprise a sequence of non-uniformly spaced pulsed signals of equal time duration.

5. The method of claim 4 wherein said sequence includes first, second, third and fourth pulses having time intervals of $t_1$ between said first and second pulses and said third and fourth pulses and $t_2$ between said second and third pulses.

6. The method of claim 4 wherein said obtaining step includes the step of autocorrelating received sonar signals to determine bottom depth.

7. The method of claim 4 wherein said obtaining step includes the step of utilizing OSP depth data to establish depth gates for received sonar signals.

8. The method of claim 4 wherein ambient sea noise, OSP depth data, and a predetermined signal-to-noise ratio are utilized to establish power levels of transmitted sonar signals.

9. The method of claim 2 wherein said buffers are at least equal to said inertial navigation system's largest possible error.

10. The method of claim 9 wherein said obtaining step further includes the steps of transmitting and receiving sonar signals to collect bottom data.

11. The method of claim 10 wherein said sonar signals comprise a sequence of non-uniformly spaced pulsed signals of equal time duration.

12. The method of claim 11 wherein said sequence includes first, second, third and fourth pulses having time intervals of $t_1$ between said first and second pulses and said third and fourth pulses and $t_2$ between said second and third pulses.

13. The method of claim 11 wherein said obtaining step includes the step of autocorrelating received sonar signals to determine bottom depth.

14. The method of claim 11 wherein said obtaining step includes the step of utilizing OSP depth data to establish depth gates for received sonar signals.

15. The method of claim 11 wherein ambient sea noise, OSP depth data, and a predetermined signal-to-noise ratio are utilized to establish power levels of transmitted sonar signals.

16. The method of claim 2 further including the step of collecting bottom data exhibiting variations in either or both along-track and cross-track directions.

* * * * *